United States Patent [19]

Shenk

[11] 4,200,378
[45] Apr. 29, 1980

[54] AUTOMATIC FOCUSING CAMERA WITH LENS JAM SENSOR CONTROL

[75] Inventor: Edwin K. Shenk, Westford, Mass.

[73] Assignee: Polaroid Corporation, Cambridge, Mass.

[21] Appl. No.: 899,871

[22] Filed: Apr. 25, 1978

Related U.S. Application Data

[63] Continuation-in-part of Ser. No. 729,289, Oct. 4, 1976, abandoned.

[51] Int. Cl.² .............................................. G03B 3/00
[52] U.S. Cl. ...................................... 354/195; 354/25
[58] Field of Search .................................. 354/25, 195

[56] References Cited

U.S. PATENT DOCUMENTS

| | | | |
|---|---|---|---|
| 3,442,193 | 5/1969 | Pagel | 354/25 |
| 3,522,764 | 8/1970 | Biber et al. | 354/195 |
| 3,779,440 | 12/1973 | Casale et al. | 226/74 |
| 3,798,517 | 3/1974 | Whitehouse | 354/195 |
| 3,917,142 | 11/1975 | Guarderas | 226/38 |

*Primary Examiner*—Russell E. Adams

*Attorney, Agent, or Firm*—David R. Thornton

[57] ABSTRACT

An automatic focusing camera which upon initiation of a camera cycle drives the lens to a focus position, and responsive thereto, provides an exposure operation, and termination of the camera cycle includes a jam sensor arrangement operable, responsive to a lens jam, to actuate the shutter mechanism of the camera and terminate the exposure cycle. The jam sensor arrangement, in conjunction with an auto-focus circuit, terminates the lens drive and completes the camera cycle whenever a malfunction occurs in the lens drive mechanism such that its motor is energized but the lens fails to move. In addition, the use of such a jam sensor permits the same electronic package comprising a range finder system and a lens drive mechanism to be incorporated, without significant modification, into cameras having different lens drive ranges because the jam sensor automatically provides for actuation of the shutter and ultimately, termination of the camera cycle when an attempt is made to focus on and photograph a subject outside the limits to which the lens may be moved.

7 Claims, 4 Drawing Figures

AUTOMATIC FOCUSING CAMERA WITH LENS JAM SENSOR CONTROL

RELATED APPLICATIONS

This application is a continuation-in-part of parent application Ser. No. 729,289 filed Oct. 4, 1976 now abandoned, the disclosure of which is hereby incorporated by reference.

BACKGROUND OF THE INVENTION

This invention relates to auto-focusing cameras in which the camera lens is automatically varied depending on subject distance.

An auto-focus camera hving an automatically positioned lens is described in the parent application. In that arrangement, when an exposure cycle is initiated, a range finder system beams a burst of ultrasonic energy toward the subject such that the interval of time between transmission of the burst and receipt of an echo is a parameter linearly related to subject distance. A scale factor is then employed to permit comparison between the linearly related time and the lens/subject function of the camera lens.

For a given lens/subject function, the known parametric relationship between range time (subject distance) and the selected lens/subject function establishes a program for a pulse repetition frequency of a scaled clock which scales the range time, the clock output being accumulated in a range counter. Such program causes the pulse repetition frequency of the scaled clock to vary in accordance with the time derivative of an approximation of the lens/subject function to allow for a piece-wise linear approximation of the actual lens/subject function (taking the minimum circle of confusion into account). As a consequence, the content of the range counter at the end of the range time interval will be a number representing the desired focal position of the lens.

In one embodiment of the parent application, receipt of an echo terminates incrementing of the range counter by the scaled clock and enables a lens drive motor that is effective to drive the lens from a park position toward the desired focal position. Movement of the lens operates an auxiliary pulse generator whose output is used to increment the range counter. When this counter is filled, a focus control signal is generated which stops the lens drive motor and actuates the shutter mechanism to thereby complete the camera cycle. In the event that the lens drive motor is enabled but the lens is not moved (i.e., the auxiliary pulse generator is not producing pulses), it is desirable to terminate the lens drive and camera operation to prevent damage.

Moreover, as is well known, the lens/subject function establishes the relationship between the distance of a subject and the position of the lens on the camera at which an image of the subject at that distance is in focus on the focal plane of the camera. Such function also establishes the range of distances over which subjects can be brought into focus by moving the lens. Thus, the function determines the close-up distance at which close subjects can be brought into focus, as well as the hyperfocal distance which is the subject distance beyond which a subject will be in focus when the lens is at its hyperfocal position.

For lens assemblies having the same or similar lens/subject function, range of lens movement often varies depending upon the use for which the camera is designed. For example, a camera designed for an exceptionally broad range of indoor and outdoor photography may permit focusing in the range of 25 cm to infinity in order to provide as wide a latitude as possible, whereas a range of 75 cm to infinity is suitable for many photographic operations. On the other hand, a lens system designed solely for indoor flash photography need not allow lens movement to the hyperfocal position where the effective range of the flash illumination is limited.

Consequently, it is an object of this invention to prevent camera damage due to electrical or mechanical malfunctions which occur during the lens drive operation.

Another object is to provide an automatic range and focus system applicable to camera apparatus having different limits of lens displacement.

BRIEF DESCRIPTION OF THE DRAWINGS

An embodiment of the present invention is disclosed in the accompanying drawings wherein.

DETAILED DESCRIPTION

Figure 1:
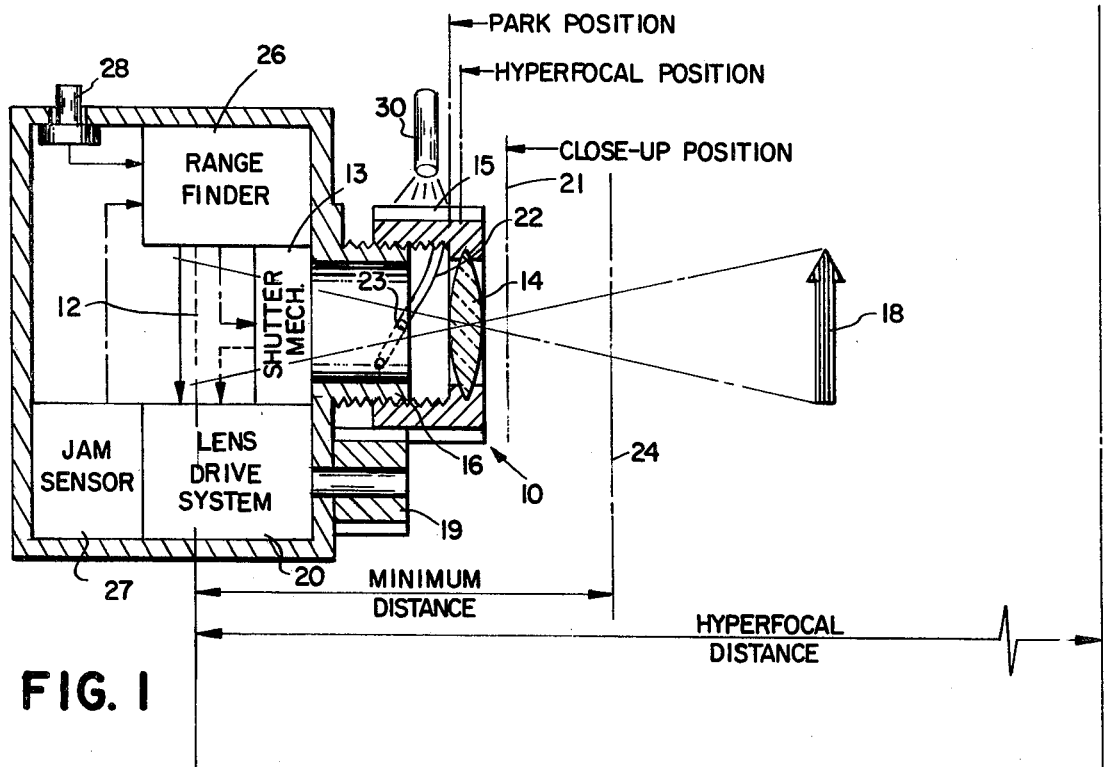
FIG. 1 is a schematic diagram of an auto-focus camera showing a lens assembly that permits focusing of an image over a wide range of subject distances.

FIG. 1 illustrates an automatic focus camera 10 of the type disclosed in the parent application identified above, but showing the camera in block diagram schematic form. Camera 10 comprises a housing 11 containing a focal plane 12 defining a recording station located behind a shutter mechanism 13. A sheet of photosensitive recording material (not shown) is located in the focal plane for receiving light from a scene being photographed when the shutter mechanism is actuated. A lens 14 is carried on one axial end of an adjustable lens mount 15 having a sleeve member 16 carrying on its opposite axial end an internal thread adapted for engaging a threaded tube 17 on the camera housing so as to permit rotation of the lens mount to impart axial displacement to the lens 14. Generally, the sleeve 17 also includes a fixed lens which is omitted for clarity of the illustration and, taken together, the lens mount 15 and sleeve provide an adjustable lens assembly having the lens 14 axially displaceable in accordance with a given lens/subject function to focus an image on the focal plane of subjects located within a given range of subject distance.

In order to adjust the axial position of the lens mount, a pinion gear 19 is provided. The teeth of this pinion gear engage the toothed periphery of lens mount 15 so that rotation of pinion gear 19 by a lens drive means 20 imparts rotation to the lens mount. Rotation of the pinion gear in one direction moves the lens mount (to the right as seen in FIG. 1) from a park position closest to the housing to a close-up position (shown by chain lines 21). The lens mount cannot be displaced in the one direction beyond the close-up position because of a stop formed by the closed end of a slot 22 in the inner surface of sleeve 17 which cooperates with a fixed pin 23, fixed to tube 17 and projecting into the slot. Rotation of the pinion gear in the opposite direction moves the lens mount in the opposite direction thereby returning it to its park position where it abuts housing 11, which limits further travel in the opposite direction.

At close-up lens position 21, subjects will be in focus when located at a minimum distance as designated by line 24, the absolute value of which is dependent on the lens/subject function as well as the range of movement of the lens mount as selected by the camera designer. At the hyperfocal position, subjects will be in focus at and beyond the hyperfocal distance designated at 25. Thus, an image of a subject located within the range of distances designated by lines 24–25 shown in FIG. 1 can be focused on the focal plane of the camera by selecting the axial position of the lens mount as prescribed by the lens/subject function.

Camera 10 also includes a range finger 26, a jam sensor 27, an actuator button 28 and a lens feedback system or auxiliary pulse generator 30. On manual depression of the actuator button, an exposure cycle of the camera is initiated whereby range finder 26 generates a range parameter directly related to subject distance and computes, from such parameter, a number representing the desired focus position of the lens mount in accordance with the lens/subject function. Then, drive means 20, responsive to the number computed by the range finder, and feedback from the pulse generator 30, drives the lens mount from its park position to the selected position or, that is, its focus position by suitable rotation of pinion gear 19. Upon arrival of the lens mount at its focus position, shutter mechanism 13 is actuated to effect exposure of the photosensitive sheet (not shown) lying in the focal plane 12. The shutter mechanism itself signals completion of exposure and the drive system ultimately responds by driving the lens mount back to its park position thereby terminating the camera cycle.

As later explained in detail in regards to FIG. 3, a jam sensor 27 is provided in order to take into account stoppage of the lens mount due either to mechanical and electrical malfunctions or to design range of lens displacement. Specifically, the jam sensor responds to failure of the lens mount to move during the lens driving operation; consequently, when a camera cycle is initiated, the lens mount is supposed to move from its park position toward its focus position. Failure of the lens mount to reach its focus position may be due to: (1) a malfunction occuring whereby the motor continues to operate while the lens mount remains stationary; or (2) the subject is located at a distance less than the minimum distance with the result that the lens mount reaches its close-up focus position and can travel no further by reason of the cooperation between pin 23 and slot 22. In either case, motor operation is terminated, the exposure system is actuated, and the camera cycle ultimately terminated.

The ability of the jam sensor to actuate the camera through an exposure cycle when the subject is located closer to the camera than the minimum distance as defined by the lens mount, permits the electronic package comprising the range finder, the drive, and the jam sensor to be utilized with cameras having a lens mount with different minimum distances. This has the obvious advantage of permitting different types of cameras to be developed each with its own optical system that is designed to operate under special conditions.

Figure 2:
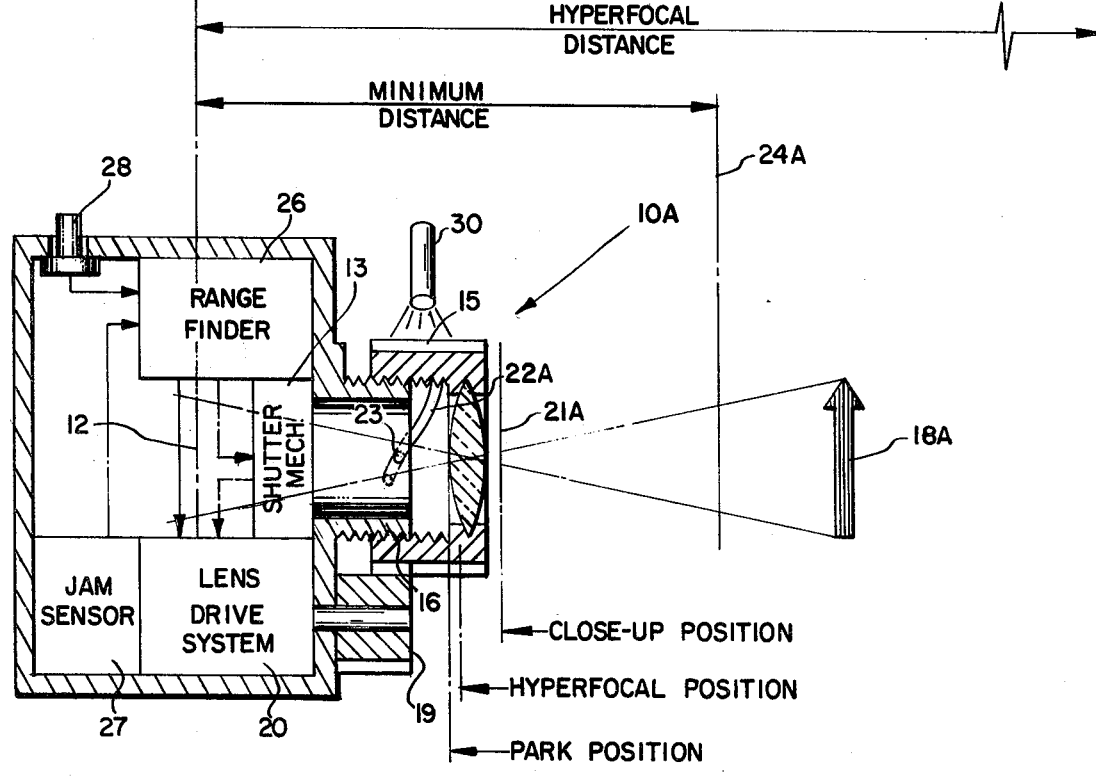
FIG. 2 is a schematic diagram of a camera similar to that of FIG. 1, but having a lens assembly wherein the minimum distance at which a subject can be brought into focus is less than the minimum distance associated with the camera shown in FIG. 1.

A camera having a different lens mount configuration such as displacement range is illustrated in FIG. 2 which has a minimum subject distance 24A of less than the minimum distance 24 of the camera shown in FIG. 1. Camera 10A has substantially the same components as the camera shown in FIG. 1 and depression of shutter operator button 28 will cause range finder 26 of the electronic package, which is identical to the package shown in FIG. 1, to determine a range parameter associated with object 18A and will cause the lens drive system 20 to impart rotation to pinion gear 19 which has the effect of moving lens mount 15 to an axial position at which the subject 18A will be in focus according to the lens/subject function of the lens mount. In the camera shown in FIG. 2, lens mount 15 will be stopped when its pin 23 reaches the end of slot 22A which corresponds to a focus position for an object as close as minimum distance 24A. That is to say, when lens mount 15 is at its close-up position shown by the chain line 21A, an object as close as the distance 24A will be in focus, and assuming that the minimum subject distance is say 75 cm, if an attempt is made to photograph a subject closer than this distance, the jam sensor 27A functions once the lens mount becomes immobilized due to reaching the end of its slot 22A.

Consequently, by reason of the jam sensor of the present invention, the same range finding system can be used in two different automatic focusing cameras having different limits for a movable lens mount, each with different limits of subject distances. Specifically, the jam sensor in each camera provides a jam signal under the condition that the motor is powered and the lens mount does not move and is effective, in both cameras, to depower the lens drive system or motor in the event the lens mount cannot reach its focus position by reason of the lens reaching its limits or by reason of a malfunction. Additionally, the camera cycle will be continued and ultimately terminated by the jam sensor.

Figure 3:
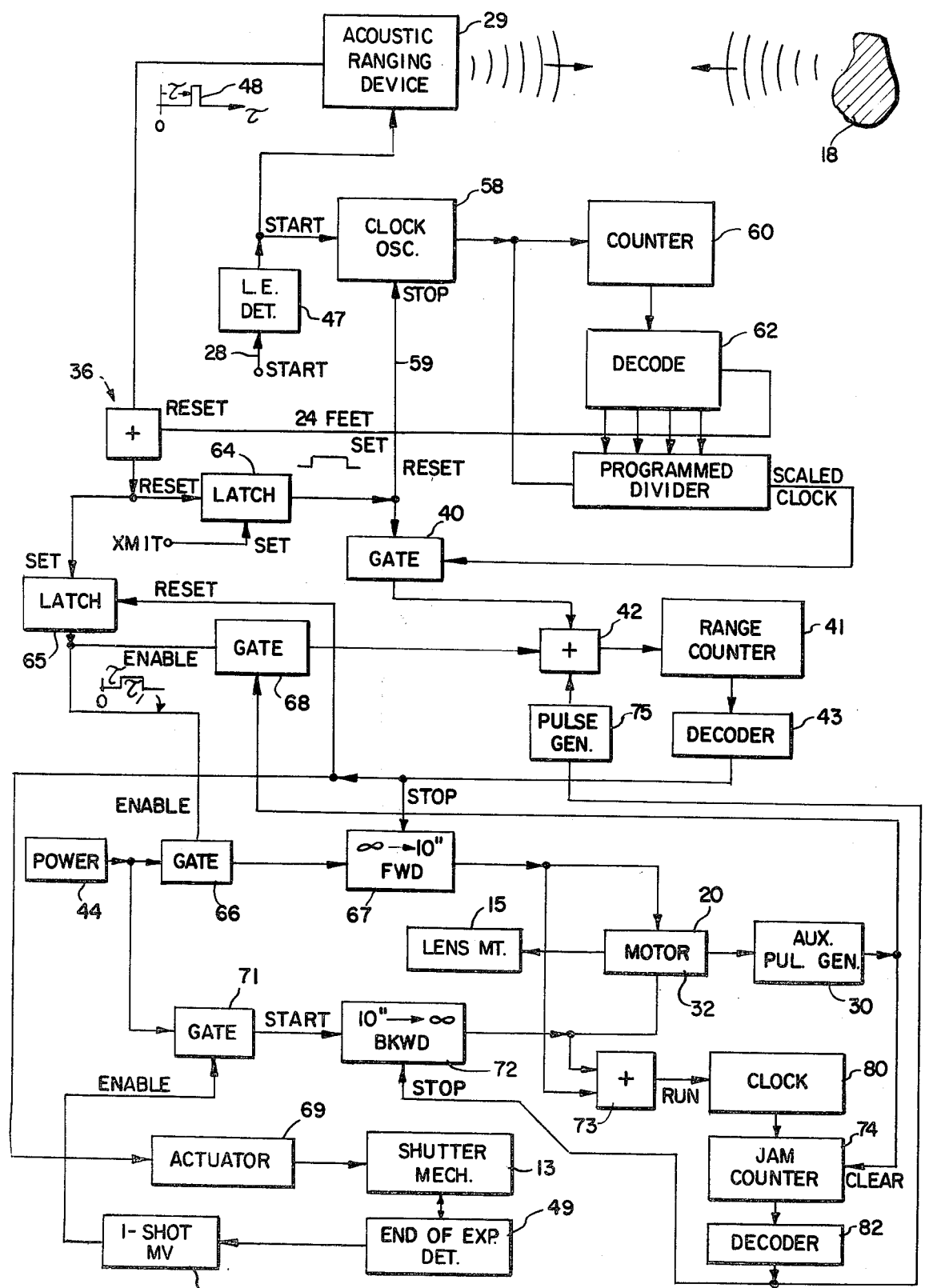
FIG. 3 is a block diagram of the preferred form of the present invention.

Referring now to FIG. 3, a block diagram is shown which is very similar to the block diagram shown in FIG. 4A of the parent application identified above. The operation of the block diagram in FIG. 3 is described below with particular attention to the jam operation.

Figure 3A:
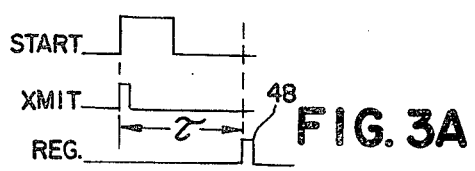
FIG. 3A is a timing diagram associated with the block diagram of FIG. 3.

In the usual situation, where the subject is located within the minimum and the maximum subject distance range of the camera, and no malfunction occurs, initiation of the camera cycle by manual actuation of shutter release button 28 (shown schematically in FIG. 3) powers the camera from a supply 44 and actuates the range finder 26 by establishing a step function whose leading edge is detected at 47 and used to key an acoustic ranging device 29 as well as to start the operation of a clock 58. The acoustic ranging device 29 transmits a burst of ultrasonic energy which is beamed at object 18. Energy reflected from the subject will be received by the acoustic ranging device and cause the latter to produce a range pulse 48 (see FIG. 3A) at a time $\tau$. During the latter interval, clock 58 produces a train of pulses which increment a counter 60 while a decoder 62 serves to decode the contents of counter 60 to produce the break points of an approximation of the lens/subject function as described in the above-identified parent application. A programmed divider 63, responsive to the output of decoder 62, functions as a scaled clock whose pulse repetition frequency varies in accordance with the approximation of the lens/subject function which, itself, is parametrically related to time in accordance with the relationship between the interval $\tau$ and subject distance. The output of a divider 63 is applied through an AND gate 40 and an OR gate 42 to a range counter 41. The program of divider 63 being established in accordance with the predetermined lens/subject function. A latch 64, set by the transmit signal, is reset upon receipt of the pulse 48. Thus, the output of latch 64 is a pulse of duration $\tau$ as indicated in FIG. 3 and gate 40 is enabled by latch 64 to pass pulses from divider 63 only during this time.

Consequently, the scaled clock pulses are fed to the range counter 41 during this time such that the contents of the range counter at the end of ranging is representative of the desired focal position of the lens. Each succeeding pulse delivered to the divider 63 is representative of subject distance proceeding from a close to far distant subjects and likewise each pulse stored in the range counter is representative of lens position preceeding from the close-up position to the hyperfocal position. Hence, when echo pulse 48 occurs and gate 40 closes, the contents of range counter 41 will be p, where p is a number representing the focus position of the lens mount as measured from the close-up subject distance. As explained below, while the total count of the range counter is $p_3$, which represents the park position, a few counts beyond the hyperfocal position, the maximum number that can be inserted into counter 41 by the scaled clock is $p_2$ which represents the hyperfocal position of the lens mount.

When a camera cycle is initiated, the lens mount is located at its park position with which the number $p_3$ is associated. To reach its focus position represented by the number p, the lens mount must be displaced a distance proportional to $p_3-p$. This result is achieved by decoder 43 which produces a focus control signal when the contents of counter 41 is filled, i.e., reaches the number $p_3$, the counter being incremented from its value p by displacement of the lens mount as described below.

In addition to closing gate 40 and terminating the incrementing of counter 41 by the scaled clock, echo pulse 48 also sets a latch 65 which enables AND gate 68 and AND gate 66. Enablement of gate 66 applies power to a motor 32 of drive system 20 through a forward motor control 67 while gate 68 holds gate 42 enabled so as to permit conduction to the range counter of lens position pulses from the auxiliary pulse generator 30; the details of which are described in the parent application. Power from the supply 44 is thus applied through the forward motor control 67 to energize a motor 32 operatively connected to lens mount 15 through the pinion gear 19. Motor 32 moves the lens mount toward the desired focal position and the auxiliary pulse generator 30 produces pulses accumulated in range counter 41 in proportion to the axial displacement of the lens mount.

Thus, the contents of counter 41 increases from p towards a full up condition, i.e., the number $p_3$. When the contents of counter 41 reaches $p_3$, decoder 43 produces a focus control signal which resets the latch 65 thereby cutting power to the range portion 26 of the camera and also disables forward motor control 67, thereby stopping the motor 32 and further lens movement. In addition, the focus control signal produced by decoder 43 is applied to actuator 69 which actuates shutter mechanism 13 thereby exposing the film located at film plane 12 of the camera.

Completion of exposure is detected at 49 thereby triggering one-shot multivibrator 70 which produces a voltage for a predetermined period of time enabling gate 71 for this period and permitting power 44 to be applied to a backward motor control 72 which is effective for this period of time to power motor 32 in the direction opposite to the direction in which control 67 powered the motor; and the motor will thus drive lens mount 15 from its focus position back to its park position. A clutch (not shown) prevents burn-out of the motor when the lens reaches its park position prior to the end of the time period set by the multivibrator 70. The termination of the latter, in any case, completes the camera cycle with power off until the actuator button 28 is again depressed.

In the event that a mechanical malfunction occurs and motor 32 is unable to drive lens mount 15 to its focus position, jam sensor 27 is effective to actuate the exposure mechanism and subsequently terminate the camera cycle. The example that follows assumes that the subject is located between the minimum distance and the hyperfocal distance of the camera. In such case, the operation in response to initiation of an exposure cycle as described above is such that range counter 41 contains the number p representative of the focus position of the subject. In the normal course of events, motor 32 would be effective to drive the lens mount from the park position to its focus position. If a mechanical malfunction occurs, the motor 32 is energized when gate 66 is enabled by the setting of latch 65, but pinion gear 19 is unable to move lens mount 15, and auxiliary pulse generator 35 will be unable to provide pulses to range counter 41. As a consequence, there is no further input of lens feedback pulses to the range counter and decoder 43 is unable to produce a focus control signal to operate actuator 69. Under these conditions, jam sensor 27 becomes effective to enable decoder 43 to produce a focus control signal. The jam sensor comprises a timing network reset by the lens feedback and is illustrated as a clock 80, a decoder 82 and a jam counter 74 which is progressively incremented by the clock during enablement of the OR gate 73 responsive to motor run and is cleared periodically by the output of auxiliary pulse generator 35. Specifically, the input to the jam counter 74 is a train of reference pulses derived from the clock 80 whose pulse repetition frequency is much larger than the rate at which pulse generator 35 is capable of producing pulses when driven by motor 32.

As seen in FIG. 3, the reference pulses from the jam clock 80 appear at the input to the jam counter only when either motor control 67 or 72 is operational. Thus, no reference pulses are applied to the jam counter during the time that acoustic ranging device 29 is in operation and before an echo signal is returned from the subject. After motor 32 is energized for moving lens mount 15 to its focus position, jam counter 74 begins to receive its train of reference pulses. Because the pulse repetition frequency of the reference pulses is greatly in excess of the output of auxiliary pulse generator 35, jam counter 74 will be cleared periodically before the counter can reach a predetermined number. The decoder 82 senses the presence of a predetermined number in counter 74, its presence being indicative of a failure of this counter to be cleared by the output of auxiliary pulse generator 35. In other words, decoder 82 will produce a jam signal only if motor 32, while energized, is unable to move the lens mount.

The jam signal produced by decoder 82 is utilized to stop the motor drive and for the purpose of triggering a pulse generator 75 whose output is applied through OR gate 42 to range counter 41. Thus, the jam sensor 27 is effective, in the event of a mechanical malfunction during forward movement of the lens mount, to stop motor control 67 and to furnish sufficient pulses to counter 41 to fill up the counter for the purpose of causing decoder 43 to produce a focus control signal that will operate actuator 69 and complete the exposure and the camera cycle as described above. On the other hand, if a malfunction occurs during rearward movement of the lens mount, the decoder 82 directly stops the motor drive prior to the completion of the camera cycle as set by the multivibrator 70.

Advantageously, when the present system is applied to a camera having a restricted lens range and an attempt is made to focus on a subject at a distance less than the minimum distance for which the optical system has been designed, the jam sensor is also effective to actuate the exposure mechanism and thereby complete the camera cycle.

Consequently, when the system of FIG. 3 is applied to the camera of FIG. 2, and assuming that a subject to be photographed is located closer than the minimum distance, the range counter 41 cannot be filled by the lens feedback pulses because the lens is stopped by the stop 23 reaching the end of its design run. However, the jam sensor 27, operating as discussed above, will stop the motor and to fill up the range counter 41 thereby continuing the camera cycle.

Stated otherwise, when the lens mount arrives at its close-up position, further movement of the lens mount is precluded in the manner as described in connection with FIG. 2 even though motor 32 remains energized. In the absence of an output from auxiliary pulse generator 35, clearing pulses are no longer applied to the jam counter 74. As a consequence, reference pulses incrementing counter 74 will quickly permit the counter to reach the predetermined number associated with decoder 82 and a jam signal will then result and an exposure is made. In this case, the sharpness of focus will, of course, depend upon exactly how close the subject is to the minimum design distance.

In the described embodiments, the lens return is controlled by the multivibrator which latches the electrical system on until the lens reaches its park position; however, in many instances it may be preferable to employ a lens switch which is closed only when the lens is out of its part position to simplify the system logic and to automatically terminate the lens drive when the lens again reaches its park position. For example, the multivibrator, may be replaced by a gate in combination with the described lens switch to allow power conduction for rearward lens drive only until the lens reaches its park position.

It is believed that the advantages and improved results furnished by the method and apparatus of the present invention are apparent from the foregoing description of the preferred embodiment of the invention. Changes and modifications can be made without departing from the spirit and scope of the invention as sought to be defined in the claims that follow.

What is claimed is:

1. An automatic focusing camera having a housing containing a focal plane defining a recording station located behind a shutter mechanism, means for initiating a camera cycle, a lens mount movable on the camera for focusing an image of a subject on the focal plane, a range finder system for generating a range parameter related to subject distance, the range finder system including a pulse generator responsive to the lens movement for generating a pulse train, drive means operable when energized to move the lens mount toward a focus position selected in accordance with the parameter, the improvement comprising:
   a jam sensor for producing a jam signal if the lens mount does not move to the selected focus position in response to operation of the drive means, the jam sensor including a jam counter that counts at a predetermined rate and is cleared at a rate directly related to the pulse train, and a jam counter decoder responsive to sensing a predetermined count in the jam counter for producing the jam signal whereby the jam sensor produces the jam signal when the drive means is enabled and the lens mount fails to move; and
   means responsive to the jam signal for disabling the drive means.

2. An automaic focusing camera according to claim 1 wherein the range finder system includes a range counter for storing a range number which is related to the focus position of the lens mount, a second pulse generator responsive to a jam signal for incrementing the range counter, and the means for generating a focus signal includes a range counter decoder which is responsive to sensing a predetermined count in the range counter for producing the focus signal.

3. An automatic focusing camera wherein, in response to initiation of a camera cycle, a lens mount is driven from a park position to a focus position depending on the subject distance as determined by a range finder system that generates a range parameter related to subject distance, the improvement comprising:
   a jam sensor for detecting movement of the lens mount toward its focus position and operable to produce a jam signal to terminate the camera cycle if the lens mount stops short of its focus position; and means responsive to movement of the lens mount to its focus position for continuing operation of the camera cycle to provide an exposure and to return the camera to its substantially deenergized state, said means for continuing the camera cycle also being responsive to said jam signal.

4. An automatic focusing camera having a housing containing a focal plane defining a recording station located behind a shutter mechanism, means for initiating a camera cycle, a lens movable on the camera for focusing an image of a subject on the focal plane, a range finder system for generating a range parameter related to subject distance, drive means operable when energized to move the lens mount toward a focus position selected in accordance with the parameter, an actuator operable to actuate the shutter mechanism in response to the focus signal, means responsive to termination of exposure by the shutter mechanism for enabling the drive means to move the lens mount back towards its start position, the improvement comprising:
   a jam sensor for producing a jam signal if the lens mount does not move to the selected focus position in response to operation of the drive means;
   means responsive to the jam signal for disabling the drive means; and
   means responsive to the enabling of said drive means for enabling the jam sensor.

5. An auto-focusing camera comprising a housing having means for defining a film plane, a variable lens mounted for displacement to a plurality of positions to focus image forming light rays of the photographic scene at said film plane in accordance with lens position, means for limiting the displacement of said lens for focusing light rays from subjects located within a limited subject distance range, a ranging system for determining subject distance from said camera, said ranging system providing a range parameter as an electrical range signal selected in accordance with the distance of a photographic subject located within an extended subject distance range of greater extent than said limited range, and independently operative electrically energizable means for displacing said lens toward a lens position selected in accordance with said range parameter, a shutter system actuatable responsive to a given signal for exposing a recording medium located at said film plane, and means responsive to said lens system reaching a position in correspondence with said range parameter for producing said given signal so as to actuate said shutter system, the improvement comprising a jam sensing means responsive to limiting of said lens displacement for automatically terminating operation of said displacing means whereby said ranging system which is operable over said extended range is made compatible with said camera which is operable over said limited range, said jam sensing means including a jam circuit for sensing stopping of said lens prior to its reaching a position in correspondence with said range signal and in response thereto for deenergizing said displacing means, and said jam sensing means including means responsive to stoppage of said lens for producing said given signal so as to actuate said shutter system.

6. A method for utilizing the same range finder system in two automaic focusing cameras having different types of movable lens mounts, each of which has a close-up focus position at which a subject at a minimum distance is in focus, the minimum distances being different for each lens mount, and wherein the range finder system provides a parameter related to subject distance for subjects located at a distance as close as the lesser of the minimum distances, each camera having a selectively powered electrical drive system coupled to the lens mount for moving the same toward a focus position selected in accordance with the parameter, the method comprising:
providing a jam sensor in each camera for producing a jam signal under the condition that the motor is powered and the lens mount does not move;
using the jam signal to depower the drive system whereby the jam signal is effective in each camera in the event the lens mount cannot reach its focus position due to a malfunction in lens movement and is also effective in the camera having the lens mount with the greater of the two minimum distances to depower the drive system when the lens mount reaches its close-up focus position and the subject is closer than the minimum distance associated with this lens mount; and
using the jam signal to actuate the shutter mechanism of the camera.

7. An automatic focusing camera having a housing containing a focal plane defining a recording station located behind a shutter mechanism, means for initiating a camera cycle, a lens movable on the camera for focusing an image of a subject on the focal plane, a range finder system for generating a range parameter related to subject distance, drive means operable when energized to move the lens toward a focus position selected in accordance with the parameter, the improvement comprising:
a jam sensor for producing a jam signal if the lens does not move to the selected focus position in response to operation of the drive means; in-focus means for evaluating the position of the lens and for disabling the drive means when the lens reaches the selected focus position, the in-focus means also being responsive to the jam signal for disabling the drive means; the in-focus means including a counter arrangement for receiving a train of lens position pulses during lens movement and, in accordance with the range parameter, for deenergizing the drive means when a given number of lens position pulses has been received; the jam signal comprising a train of jam pulses sufficient to produce the given number of pulses; and the jam sensor including means for conducting the train of jam pulses to the counter arrangement so that the counter arrangement will also thereby disable the drive means responsive to the jam pulses.

* * * * *